United States Patent [19]

Fricker et al.

[11] Patent Number: 4,495,147
[45] Date of Patent: Jan. 22, 1985

[54] HEAT-RETARDING CLOSURE SYSTEM FOR PRESSURE RELIEF OPENINGS OF PARTITIONS, IN NUCLEAR REACTOR BUILDINGS

[75] Inventors: Wolfgang-Peter Fricker, Freinsheim; Manfred Scholz; Heinrich Bauche, both of Erlangen; Bernd Gollasch, Nürnberg, all of Fed. Rep. of Germany

[73] Assignees: Kraftwerk Union Aktiengesellschaft, Müheim an der Ruhr; Grünzweig & Hartmann Montage GmbH, Ludwigshafen, both of Fed. Rep. of Germany

[21] Appl. No.: 227,507

[22] Filed: Jan. 22, 1981

[30] Foreign Application Priority Data

Jan. 23, 1980 [DE] Fed. Rep. of Germany ....... 3002335

[51] Int. Cl.³ ............................................. G21C 11/08
[52] U.S. Cl. .................................... 376/283; 376/287; 376/292; 376/461; 137/68 R; 220/203
[58] Field of Search ................ 376/283, 289, 307, 277, 376/247, 294, 245, 285, 287, 288, 291, 292, 295, 296; 137/68 R, 484.6, 458; 220/207, 203

[56] References Cited

U.S. PATENT DOCUMENTS

| 3,742,968 | 7/1973 | Kennedy | 137/68 R |
| 3,994,776 | 11/1976 | Keller | 376/289 |
| 4,064,003 | 12/1977 | Newton | 137/68 R |
| 4,258,521 | 3/1981 | Fricker et al. | 376/289 X |
| 4,278,181 | 7/1981 | Wood et al. | 220/89 A |
| 4,292,134 | 9/1981 | Eriksson | 376/289 |

FOREIGN PATENT DOCUMENTS

| 1078247 | 3/1960 | Fed. Rep. of Germany . |
| 1145881 | 3/1963 | Fed. Rep. of Germany . |
| 2160991 | 6/1973 | Fed. Rep. of Germany . |
| 2719923 | 5/1977 | Fed. Rep. of Germany . |
| 2924073 | 12/1980 | Fed. Rep. of Germany . |
| 0591742 | 9/1977 | Switzerland . |

*Primary Examiner*—Richard E. Schafer
*Assistant Examiner*—Daniel Wasil
*Attorney, Agent, or Firm*—Herbert L. Lerner; Laurence A. Greenberg

[57] ABSTRACT

Heat retarding closure system for partitions having pressure relief openings formed therein especially in nuclear reactor buildings where main coolant nozzles of a reactor pressure vessel penetrate a biological shield, including lightweight construction closure elements having a side facing the reactor and anchors for holding the closure elements, the closure elements being pushable out of the anchors by an overpressure in a given pressure difference direction on the reactor side, and an outer sealing blowout skin, the closure elements being in the form of heat-retarding cassette inserts having a front surface with a peripheral shearing edge formed thereon resting against the blowout skin, and the blowout skin having a given thickness in the given pressure difference direction enabling the cassette insert to shear off the blowout skin and be pushed out of the anchors when a given pressure difference is at least reached.

9 Claims, 9 Drawing Figures

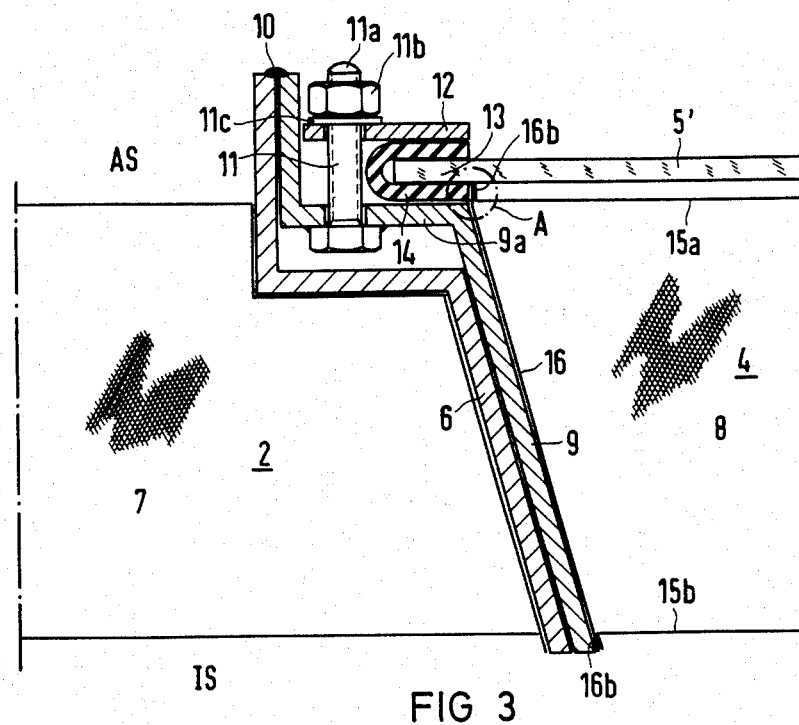
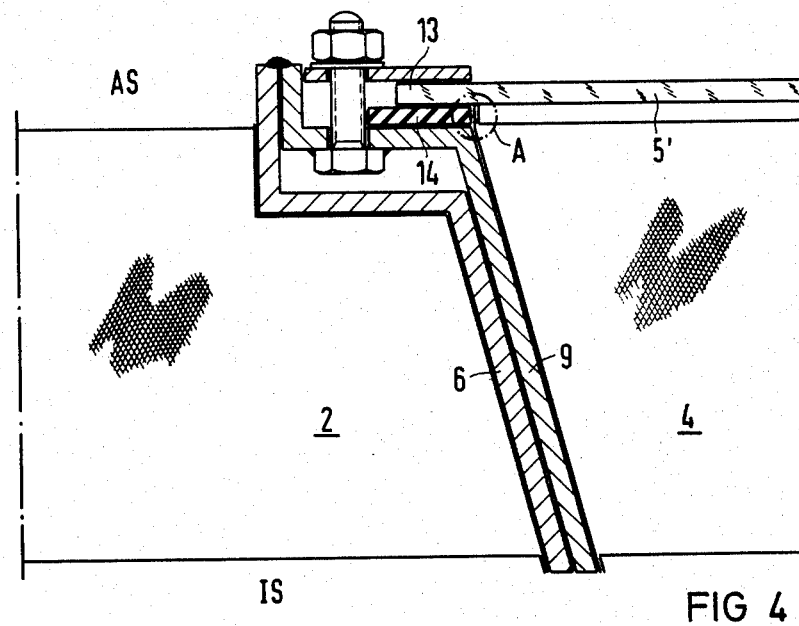

HEAT-RETARDING CLOSURE SYSTEM FOR PRESSURE RELIEF OPENINGS OF PARTITIONS, IN NUCLEAR REACTOR BUILDINGS

The invention relates to a heat-retarding closure system for pressure relief openings of partitions, especially of those in nuclear reactor buildings, in the area where the main coolant nozzles of the reactor pressure vessel penetrate the biological shield, with lightweight construction closure elements which can be pushed outwardly out of their anchors by an overpressure on the reactor side.

It has become known through German Published, Prosecuted Application DE-AS No. 21 60 991 to use a closure system for pressure relief openings in the biological shield of a nuclear reactor pressure vessel, in which several shielding chambers filled with shielding material are provided in the biological shield which are spaced around the periphery of the reactor pressure vessel and are sealed gastightly to the outside by glass panes of a predetermined blowout pressure.

A similar closure system is shown in German Published, Prosecuted Application DE-AS 27 19 923, in which the shielding elements closing the relief openings are formed of a lattice structure, the grid meshes of which are filled with granular shielding material. The grid structure is anchored in the opening of a partition by means of a frame, and the grid meshes are closed by sheet metal panels which are pushed out together with the granulate filling upon the occurrence of a given overpressure.

The present invention also starts from lightweight-construction closure elements which can be pushed outwardly out of their anchors by overpressure from the reactor side. However, the closure elements are particularly heat-retarding. They are disposed especially in the area where the main coolant nozzles of the reactor pressure vessel penetrate the biological shield. In case of a postulated fracture (improbable per se) of a main coolant line, coolant would flow through a leak fixed in its size at a certain area, e.g. 200 $cm^2$, between a double pipe and the main coolant nozzle into an annular space formed by the reactor pressure vessel and the biological shield. The overpressure built up thereby must be relieved in inherently safe fashion. Together with the outer supporting shield to which the supporting structure of the reactor pressure vessel is mounted and anchored, the biological inner shield forms the entire biological shield. However, the objective is not merely the relief of possibly occurring overpressure; in addition the nozzle space must be insulated against heat removed to the outside.

The nozzle space insulation thus forms the separation of the area under compression from the annular gap which receives its geometry or shape from the supporting shield and the inner shield.

It is accordingly an object of the invention to provide a heat-retarding closure system for pressure relief openings of partitions, especially in nuclear reactor buildings, which overcomes the hereinafore-mentioned disadvantages of the heretoforeknown devices of this general type, and through which a convection-tight closure of the pressure relief openings is made possible and which has the same effectiveness with regard to its heat retardation as the adjoining heat retarding system. Other requirements which the invention is intended to meet are the following: Blowout pressures for the closure system that are precisely determinable mathematically and experimentally; construction of the closure elements and closure system in a manner which makes cocking or canting within the pressure relief opening during the pushout process impossible; and finally, as lightweight a construction of the closure elements as possible which, when tripped, are pushed out of the pressure relief opening, in order to prevent damage to components of the environment.

With the foregoing and other objects in view there is provided, in accordance with the invention, a heat retarding closure system for partitions having pressure relief openings formed therein especially in nuclear buildings where main coolant nozzles of a reactor pressure vessel penetrate a biological shield, comprising lightweight construction closure elements having a side facing the reactor and anchors for holding the closure elements, the closure elements being pushable out of the anchors by an overpressure in a given pressure difference direction on the reactor side, and an outer sealing blowout skin, the closure elements being in the form of heat-retarding cassette inserts having a front surface with a peripheral shearing edge formed thereon resting against the blowout skin, and the blowout skin having a given thickness in the given pressure difference direction enabling the cassette insert to shear off the blowout skin and be pushed out of the anchors or seat when a given permissible pressure difference is at least reached or exceeded.

In accordance with another feature of the invention, the cassette insert contains retarding material in the form of mineral fibers.

In accordance with a further feature of the invention, the cassette insert is formed of metal and includes layered and mutually spaced apart retarding foils in the interior thereof in the retarding direction for retarding pressure in the pressure difference direction, the foils forming retarding cells.

In accordance with an added feature of the invention, the anchors are in the form of an expendable partition seat having an outside and an inside and being conically shaped from the inside to the outside or truncated pyramoidally shaped.

In accordance with again another feature of the invention, the cassette insert has a partition area and the blowout skin is in the form of a glass blowout pane being clamped and sealed to the partition area.

In accordance with again a further feature of the invention, the blowout skin is a metallic blowout foil.

In accordance with again an added feature of the invention, the cassette insert includes a peripheral sheet metal envelope having a front surface and the shearing edge projects from the front surface of the envelope.

In accordance with a concomitant feature of the invention, one of the foils is a front foil forming the shearing edge, the front foil having a doubly chamfered rim being substantially V-shaped and having a relatively greater thickness of its wall as a pressure foil than the others of the foils.

The advantages achievable by the invention are to be seen primarily in that the cassette inserts are lightweight elements of high heat retarding ability, through which pressure relief openings are now made possible even in the nozzle space area, particularly in pressurized-water reactors.

Other features which are considered as characteristic for the invention are set forth in the appended claims.

Although the invention is illustrated and described herein as embodied in a heat-retarding closure system for pressure relief openings of partitions, especially in nucler reactor buildings, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 3 is a diagrammatic view of a second embodiment example in a representation corresponding to FIG. 2, employing a glass pane as the blowout skin;

FIG. 4 is a diagrammatic view of a third embodiment example which is a glass pane clamping arrangement that is slightly different from that of FIG. 3;

Figure 1:
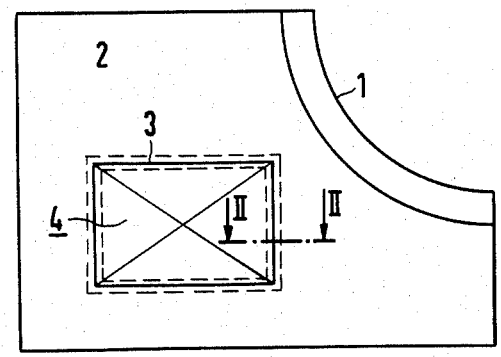
FIG. 1 is a simplified diagrammatic elevational view of a portion of a nozzle space area in a pressurized-water reactor with a heat-retarding partition and a closure element.
Figure 9:
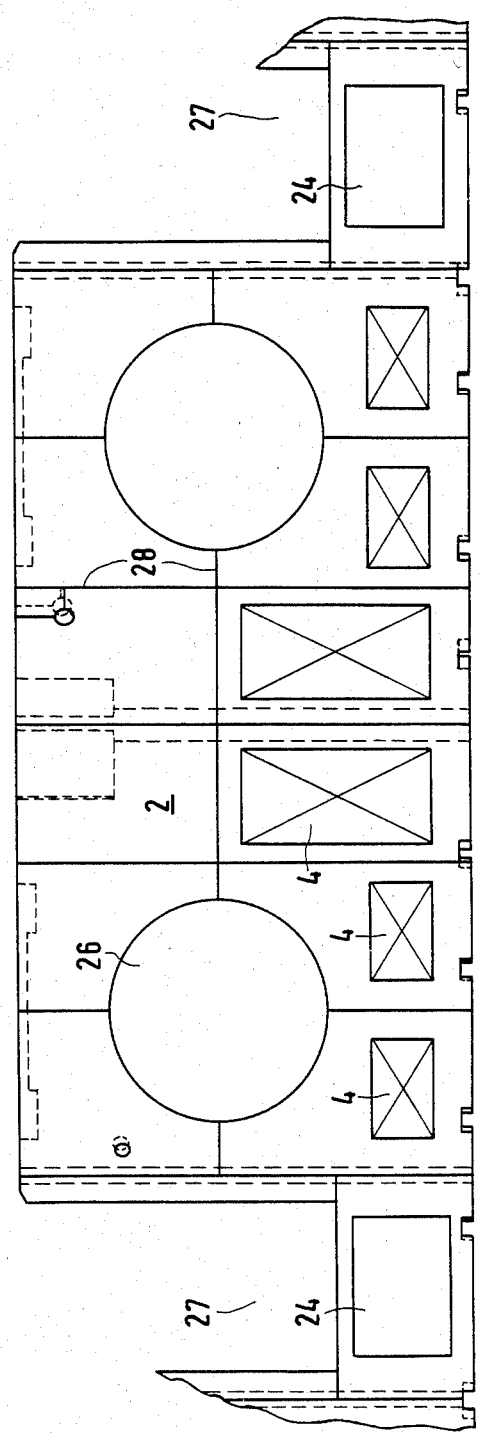
FIG. 9 is a fragmentary diagrammatic developed view of one half of the heat retarding closure system, for the nozzle space area of a pressurized-water reactor.

Referring now to the figures of the drawing and first particularly to FIG. 1 thereof, it is seen that the heat-retarding closure system is disposed in the nozzle space area of a pressurized-water nuclear reactor, the nozzle contour of which is indicated with reference numeral 1 and the heat-retarding partition 2 of which has pressure relief openings 3 closed by closure elements 4 in the form of heat-retarding cassette inserts. FIG. 1 shows only one such cassette insert 4; FIG. 9, on the other hand, shows larger sectors with several cassette inserts, which will be discussed later.

Figure 2:
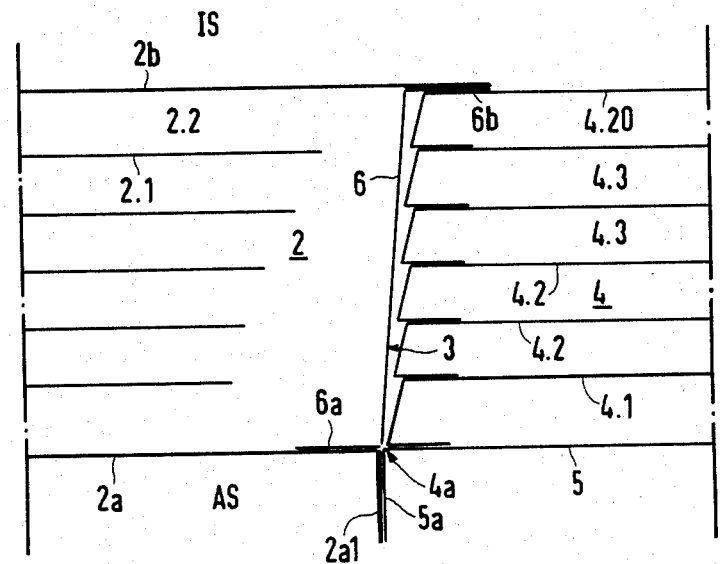
FIG. 2 is a partial cross-sectional view of FIG. 1 taken along the line II—II in the direction of the arrows, showing the closure element with its seat.

FIG. 2 shows that the front side of a peripheral shearing edge 4a of the closure element 4 constructed as a heat-retarding cassette insert rests against an outer, sealing blowout skin 5. The blowout skin 5 is gastightly welded to the periphery of the pressure relief opening 3 bounded from the inside IS to the outside AS by walls 6 of conical or truncated-pyramid shape. For this purpose the blowout foil 5 is provided with a flanged rim 5a abutting a bent-off rim 2a1 of the outer face 2a of the partition 2, the inner face of which is marked with reference numeral 2b. The partition 2 is formed as an all-metal insulation with mutually spaced, roughly plane-parallel retarding foils indicated at reference numeral 2.1, forming the air-filled retarding walls 2.2 between them and the inner and outer faces 2b, 2a. The bounding or boundary wall 6 of the pressure relief opening 3 is formed by a metal foil having flanged rim areas 6a on the outside AS and 6b on the inside IS which abut the outer face wall 2a and inner face wall 2b, respectively, and are welded gastightly to these walls.

The wall thickness (in the pressure difference direction) of the blowout skin 5 constructed as metal foil is such that when the permissible pressure difference between the inside IS and outside AS is reached or exceeded, the cassette insert 4 shears off the blowout skin with the peripheral shearing edge 4a and is itself pushed out of its seat. It then drops to the outside, but since it is of lightweight construction, it cannot damage adjacent walls or components.

In the embodiment example shown, the blowout skin is 0.4 mm thick, for example; behind it is the pressure foil 4.1 which has the shearing edge 4a. Stacked behind it, in turn, are a number of retarding foils 4.2 which are mutually spaced and form retarding cells 4.3, the number of which depends on the thickness of the retarding stack or of the partition. The conical casing or wall 6 is made of austenitic steel sheet about 1 mm thick. In the construction shown in FIG. 2, the foils 4.2 are compressed, starting at the pressure side (which is equal to the inside IS) of the system, when the afore-mentioned differential pressure occurs. The foil 4.20 which is smallest in area, is located on the pressure side. This prevents the foils 4.2 from cocking or canting. After the foils have been pushed together, the load acts upon the 1-mm thick pressure or intermediate foil 4.1. This stiffer insert now brings the pressure load to bear as forward thrust on the 0.4 mm thick blowout foil 5, which is tightly welded to the frame of the surrounding retarding system, and shears it off. This is followed by the complete insert being pushed out; the overflow section is open for the medium to flow out.

In the embodiment example according to FIG. 2, therefore, the cassette insert 4 is an all-metal structure, the retarding foils 4.20, 4.2 and 4.1 each being doubly chamfered in V-shape at their outer rim with the outside leg of their bevels each contacting the bottom surface of the respectively adjacent retarding foil in convection-retarding fashion.

Figure 7:
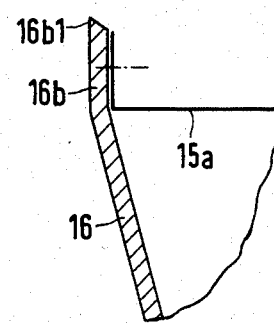
FIG. 7 is an enlarged fragmentary view within the dot-dash circles A of FIGS. 3, 4 and 6.

In the second embodiment example according to FIG. 3, the cassette insert 4 contains mineral fibers 8 as retarding material, and the partition 2 also contains mineral fibers 7 instead of retarding foils. The blowout skin 5' in the second embodiment is a glass blowout pane clamped and sealed in the partition area surrounding the cassette insert 4. The seat of the blowout insert 4 is again formed by the limiting wall 6 which is tapered from the inside IS to the outside AS. Furthermore, at the inner periphery of the limiting wall 6 another correspondingly tapered insert 9 is inserted. The outside of a shoulder 9a of the insert 9 forms the seat for the glass pane 5'. The outer rim area of the insert 9 is welded gastightly to the limiting wall 6 at reference numeral 10. A tightening screw 11 is anchored and welded gastightly to the shoulder 9a. The tightening screw 11 has an outwardly-projecting end 11a onto which the holding plate 12 with appropriate through holes is laid around the outer rim 13 of the glass pane 5'; the sealing strip 14 is formed of a heat-retarding, asbestos-base sealing material. The holding plate 12 is pressed against the sealing strip 14 and the rim 13 by the nut 11b with a washer 11c, pressing these parts in sealing-fashion against the shoulder 9a. The actual blowout insert 4 has an outer metal foil encapsulation with the sheet metal faces 15a, 15b and an enveloping sheet metal part 16. On the outside AS and inside IS the enveloping sheet has a peripheral, projecting rim 16a, 16b each. Each rim is welded gastightly to the sheet metal faces 15a, 15b, respectively. For this purpose the sheet metal faces 15a, 15b have a folded outer rim. In this embodiment example, the peripheral, projecting rim 16b is provided with an acutely beveled bursting edge 16b1, as shown more clearly in the detailed view of the circle A according to FIG. 7. Thus a break-determining edge is formed which, when tripped, pushes against the glass pane 5', causing it to burst due to the shear stress, whereupon the cassette insert 4 is pushed out again.

FIG. 4 shows a third embodiment example which is a modification as compared to FIG. 3 inasmuch as the sealing strip 14 does not envelop the rim 13 of the glass pane 5' in U-shape, but is in contact with it on one side only. Otherwise, the construction is identical with that of FIG. 3.

The fourth embodiment example according to FIG. 5 again agrees with that of FIG. 3, except for the fact that both the partition 2 and the closure element 4 have a metal foil insulation and that the shearing edge of the pressure foil 4.1 is constructed like the shearing edge 4a of FIG. 2.

Figure 5:
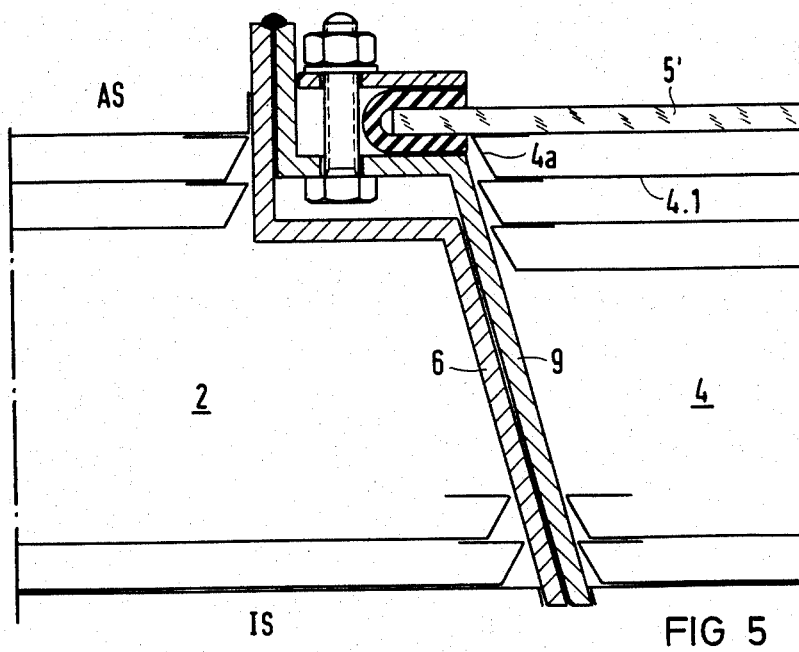
FIG. 5 is a diagrammatic view of a fourth embodiment example similar to that according to FIG. 3, except that mutually spaced metal foils instead of mineral fibers are used as retarding material.
Figure 6:
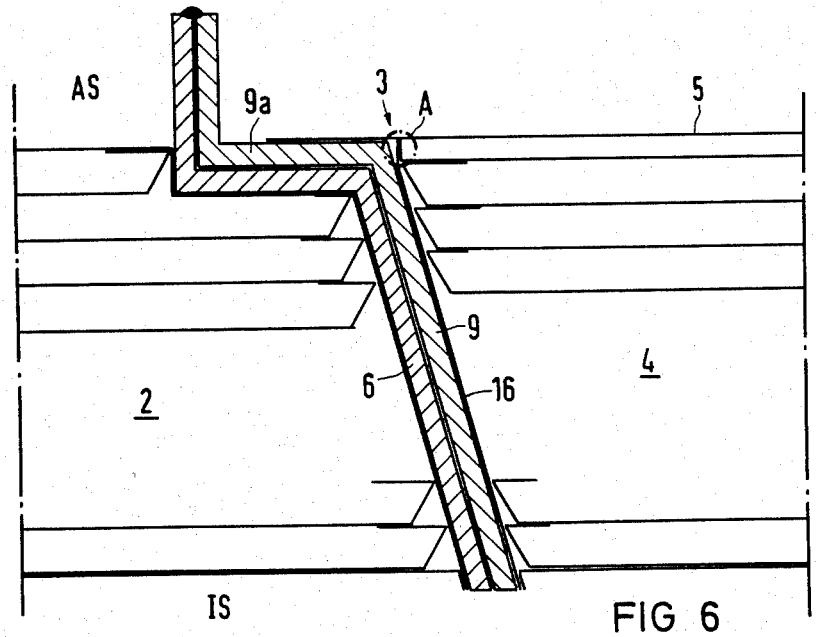
FIG. 6 is a diagrammatic view of a fifth embodiment example using a blowout foil as the blowout skin instead of a glass pane.

In the fifth embodiment example according to FIG. 6, a metal foil insulation for the partition 2 and the closure element 4 according to FIG. 2 are also provided, but deviating from the embodiment example according to FIG. 5, instead of glass a metallic blowout panel 5 is provided to close the pressure relief openings 3 which is formed in this case by the tapered sheet metal seat 9. The construction of the shearing edge 16b1 (see FIG. 7) is identical with that according to FIGS. 3 and 4. The edge is again formed by a projection rim of the enveloping sheet metal part 16.

Figure 8:
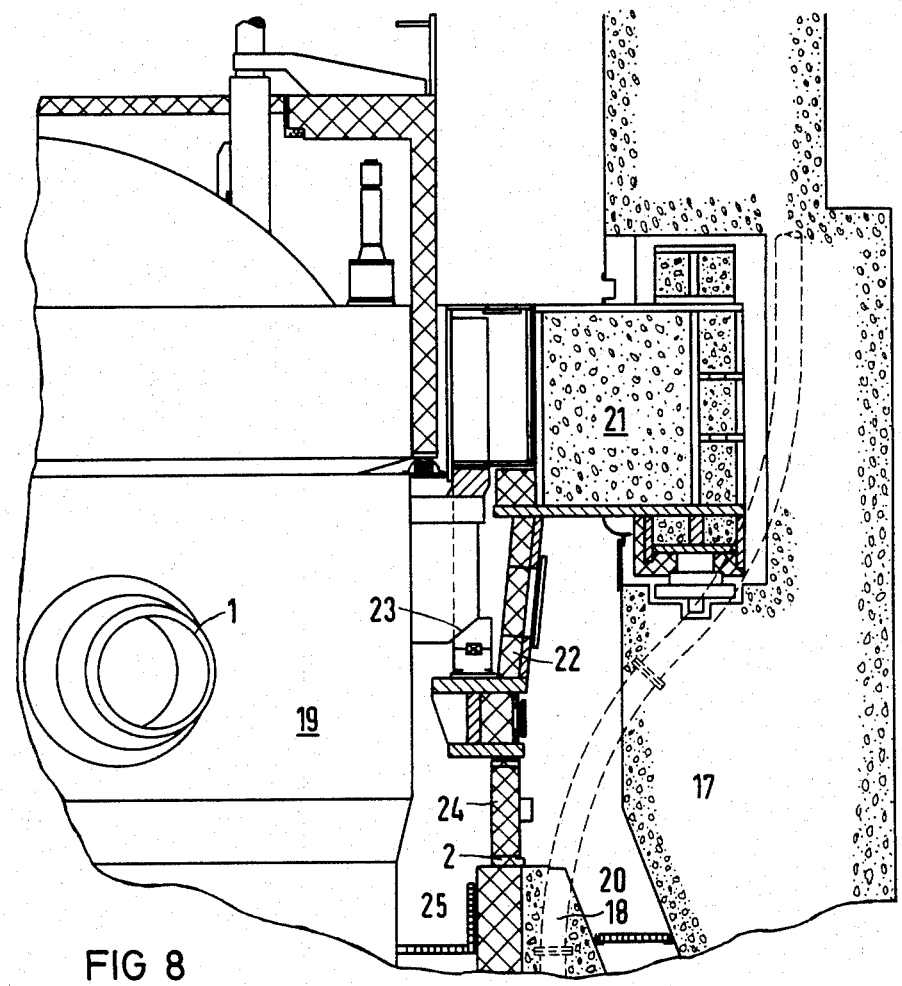
FIG. 8 is a fragmentary diagrammatic elevational view of a portion of a nuclear reactor pressure vessel with its biological shield, to show the location of the heat-retarding closure system.

In the partial view of FIG. 8, there may be seen the outer supporting shield 17 and the inner shield 18 of the biological shield for a nuclear reactor pressure vessel 19 with a nozzle 1. An annular gap 20 is disposed between the supporting shield 17 and inner shield 18, serving among other things to cool the shield and to relieve a possible overpressure. This can be relieved through an overflow canal with a spill valve disposed in the supporting shield 17 at the lower end thereof which is not shown. The ring box girder 21, anchored in the supporting shield 17, forms bearing surfaces for the support lugs 23 of the pressure vessel 19 with the brackets 22, which are distributed over the circumference of the pressure vessel 19. The in-service inspection door 24 which permits access to the annular space 25 between pressure vessel 19 and inner shield 18, forms part of the partition 2 in the nozzle space area.

FIG. 9 shows, in a fragmentary view, the development of the partition in the nozzle space area with the nozzle leadthrough openings 26, the in-service inspection doors 24 and the closure elements 4, identified by diagonal lines and constructed as blowout elements. Of the eight nozzle leadthroughs 26 only two are shown; the development therefore covers slightly more than 45°. Above the in-service inspection doors 24, partition recesses 27 are located, where the brackets 22 (see FIG. 8) project into the partition area.

The particular advantage of the closure system is that the partition can be built completely by the building block system (see joints 28 between individual partition components) and assembled for trial outside of the reactor building. If all dimensions are correct, installation in the inner shield area (FIG. 8) can take place successively.

We claim:

1. Heat retarding closure system, for partitions having pressure relief openings formed therein, in nuclear reactor buildings where main coolant nozzles of a reactor pressure vessel penetrate a biological shield, comprising blowout inserts in the form of closure elements having a side facing the reactor, a side facing away from the reactor and anchors for holding said closure elements, said blowout inserts being pushable out of said anchors by an overpressure in a given pressure difference direction on said side facing the reactor, and an outer sealing blowout skin, said blowout inserts being in the form of heat-retarding cassette inserts having a front surface at said side facing away from the reactor with a peripheral shearing edge formed thereon resting against said blowout skin, said blowout skin having a given thickness in said given pressure difference direction, said blowout skin being sheared off by said shearing edge of said cassette insert and said cassette insert being pushed out of said anchors when a given pressure difference is reached, said anchors being in the form of a partition seat having an outside and an inside and said partition seat and blowout insert being widened from the inside to the outside.

2. Closure system according to claim 1, wherein said cassette insert contains retarding material in the form of mineral fibers.

3. Closure system according to claim 1, wherein said cassette insert is formed of metal and includes layered and mutually spaced apart retarding foils in the interior thereof for retarding pressure in said pressure difference direction, said foils forming retarding cells.

4. Closure system according to claim 1, wherein said blowout insert and partition seat are conically shaped from the inside to the outside.

5. Closure system according to claim 1, wherein said blowout insert and partition seat are truncated pyramoidally shaped from the inside to the outside.

6. Closure system according to claim 1, wherein said cassette insert has a partition area and said blowout skin is in the form of a glass blowout pane being clamped and sealed to said partition area.

7. Closure system according to claim 1, wherein said blowout skin is a metallic blowout foil.

8. Closure system according to claim 1, wherein said cassette insert includes a peripheral sheet metal envelope having a front surface and said shearing edge projects from said front surface of said envelope.

9. Closure system according to claim 3, wherein one of said foils is a front foil forming said shearing edge, said front foil having a doubly chamfered rim being substantially V-shaped and having a relatively greater thickness than the others of said foils.

* * * * *